(12) United States Patent
McCrink (10) Patent No.: US 7,232,053 B2
(45) Date of Patent: Jun. 19, 2007

(54) SEAM-WELDED AIR HARDENABLE STEEL CONSTRUCTIONS

(75) Inventor: Edward J. McCrink, Rancho Santa Fe, CA (US)

(73) Assignee: KVA, Inc., Rancho Santa Fe, CA (US)

( * ) Notice: Subject to any disclaimer, the term of this patent is extended or adjusted under 35 U.S.C. 154(b) by 0 days.

(21) Appl. No.: 11/143,848

(22) Filed: Jun. 1, 2005

(65) Prior Publication Data

US 2007/0034673 A1 Feb. 15, 2007

Related U.S. Application Data

(63) Continuation-in-part of application No. 10/519,910, filed on Dec. 30, 2004.

(51) Int. Cl.
| | |
|---|---|
| *B23K 20/22* | (2006.01) |
| *B23K 35/24* | (2006.01) |
| *B23K 28/00* | (2006.01) |
| *B21D 39/02* | (2006.01) |
| *C21D 9/08* | (2006.01) |

(52) U.S. Cl. ............... 228/262.41; 228/144; 228/149; 228/150; 228/199; 228/200; 228/231; 72/51; 148/592

(58) Field of Classification Search ........... 228/262.41, 228/149–150, 199–200, 231, 144; 72/51; 148/592
See application file for complete search history.

(56) References Cited

U.S. PATENT DOCUMENTS

| | | | |
|---|---|---|---|
| 3,807,715 A | 4/1974 | Nelson et al. ............... 266/5 |
| 4,062,705 A | 12/1977 | Gondo et al. ............... 148/127 |
| 4,188,419 A | 2/1980 | Detert et al. ............... 427/287 |
| 5,256,219 A * | 10/1993 | von Hagen et al. ......... 428/659 |
| 5,370,751 A | 12/1994 | von Hagen et al. ......... 148/330 |
| 5,374,322 A * | 12/1994 | Okada et al. ............... 148/663 |
| 5,770,832 A | 6/1998 | Carnes et al. ............... 219/109 |
| 5,820,703 A * | 10/1998 | Suzuki et al. ............... 148/593 |
| 5,849,116 A * | 12/1998 | Miyasaka et al. ........... 148/592 |
| 5,871,140 A * | 2/1999 | McCrink ..................... 228/132 |
| 6,293,313 B1 * | 9/2001 | McCrink ..................... 138/172 |
| 6,410,165 B1 | 6/2002 | Warren et al. ............... 428/680 |
| 6,676,777 B2 | 1/2004 | Kimura et al. .............. 148/529 |
| 6,793,744 B1 * | 9/2004 | Jung .......................... 148/325 |
| 6,814,820 B2 | 11/2004 | Oxbaysal .................... 148/671 |
| 2004/0234715 A1 * | 11/2004 | Gandy ....................... 428/36.9 |

(Continued)

FOREIGN PATENT DOCUMENTS

JP 04-191319 9/1992

(Continued)

OTHER PUBLICATIONS

T. G. Gooch "Welding metallurgy of stainless steel".

(Continued)

*Primary Examiner*—Jonathan Johnson
*Assistant Examiner*—Rachel E. Beveridge
(74) *Attorney, Agent, or Firm*—Drummond & Duckworth (57) ABSTRACT

The present invention provides seam-welded, air hardenable steel tubes, methods of manufacturing seam-welded air hardenable steel tubes, tube mills for practicing such methods and applications for using seam-welded, air hardenable steel tubing of the present invention.

7 Claims, 9 Drawing Sheets

U.S. PATENT DOCUMENTS

2004/0238079 A1 * 12/2004 Kimura et al. .............. 148/592
2005/0257861 A1 * 11/2005 Raos ........................... 148/592

FOREIGN PATENT DOCUMENTS

WO     WO2004002673 A   *   1/2004
WO     WO 2004002724 A1 *   1/2004

OTHER PUBLICATIONS

Stainless Steel World—1999 "Development of weldable martensitic stainless steel line pipe by HF-ERW process".

N. Irving Sax and Richard J. Lewis, Sr. "Hawley's Condensed Chemical Dictionary", p. 733.

* cited by examiner

SEAM-WELDED AIR HARDENABLE STEEL CONSTRUCTIONS

RELATED APPLICATIONS

This application is a continuation-in-part of my co-pending U.S. application Ser. No. 10/519,910, filed Dec. 30, 2004.

BACKGROUND OF THE INVENTION

The present application is related to seam-welded, air hardenable steel structures, tubing and pipe, structures created therefrom and methods for manufacturing seam-welded, air hardenable steel constructions.

A seam-welded, air hardenable steel tube substantially free of cracks in the weld zone has not been proposed in the prior art. "Air hardenable steel" is herein defined as steel that reaches a level of hardness sufficient to cause cracking when processed in a prior art roller-forming tube mill. Other steels which are sometimes called "air hardenable" do not reach a comparable level of hardness and therefore do not crack when processed in a prior art roller-forming tube mill; these steels are categorized herein as "partially or non-air hardenable" steels.

An example of a non-air hardenable steel currently used to manufacture seam-welded tubing is 4130 steel (UNS G10220). This steel does not crack when formed in a prior art roller-forming tube mill; however, it must be liquid-quenched after heat-treating to attain a high strength and unfortunately this liquid quenching tends to induce high levels of distortion. As a result, liquid quenched materials like 4130 have limitations when used for applications requiring frame-type structures that must be straight and free from distortion. An example of such an application is a bicycle frame. Theoretically, the highest strength-to-weight ratio would be attained if the parts could be welded together and then heated and liquid quenched as a whole, resulting in a frame with uniformly high-strength throughout all areas. However, liquid quenching an entire frame at one time would distort it beyond acceptable limits. Instead, when made from this material, bicycle frames must be constructed of individual tubes that are hardened prior to assembly and then welded or brazed together. Because welding or brazing causes localized weak areas, thicker tube walls must be used to compensate for the loss of strength and this ultimately reduces the strength-to-weight ratio of the frame. In some applications such as high performance bicycle frames, the tube wall is thickened only in those areas that will be weakened by welding or brazing to minimize the reduction of strength-to-weight ratio. Although saving weight, such measures require expensive extra processing steps such as drawing the tube. In summary, although liquid quenched steels like 4130 fill the immediate need, a great improvement in overall utility, usefulness and economy would be realized if a low-cost tubing capable of producing a structure of a higher strength-to-weight ratio were available.

One example of a partially air hardenable steel used for tube making is 410S (UNS S41008), made available by Allegheny Ludlum of Pittsburgh, Pa. 410S is a low carbon modification of 410 (UNS S41000). The low carbon level (0.08% maximum) of 410S prevents austenite formation upon heating, thereby preventing martensite formation upon cooling. This means that the metal doesn't crack in a prior art roller-forming tube mill, but also that it doesn't harden to a high strength condition. Tubing comprised of 410S lacks the strength needed for high performance load bearing applications.

Another example of partially air hardenable steel tubing is True Temper OX Gold and Platinum series tubing, produced by True Temper Sports, Inc. This is a non-stainless tubing intended for use in expensive bicycle frames that is first roller-formed and seam-welded, and then drawn. Although this steel achieves a high strength without cracking in a prior art roller-forming tube mill, it only does so due to the precise addition of expensive alloying components to prevent the heat-affected-zone (HAZ) from fully hardening on the tube mill. As explained in the company's website at the address http://www.henryjames.com/oxplat.html, these alloy steels are specially formulated to mitigate the difficulties inherent in the welding of air hardenable steel. Modifying the material to prevent cracking results in an expensive, specialty tubing with limited usefulness; for most structural applications, its cost cannot be justified. Rather than resort to the use of expensive alloys, it would be beneficial to create a process that could utilize common, inexpensive, air hardenable steel to produce tubing substantially free of cracks. Such a process would be even more beneficial if the work material could have the corrosion resistant properties of stainless steel.

Through discussion with seam-welded tube and pipe manufacturers in the industry, it is apparent that experimentation with seam-welding tubing of air hardenable steel was abandoned due to the heretofore-insurmountable problem of HAZ cracking. In standard tube production practice on a prior art roller-forming mill, the metal in the weld zone is heated and subsequently cools at a natural rate, which is sufficiently rapid to induce hardening of the material. The axial tensile stresses induced by weld zone shrinkage together with the compressive hoop and tangential stresses induced by the sizing and straightening rollers are therefore acting on material that is in a hard and somewhat brittle state. If the material being formed becomes hard and brittle enough, the weld zone will crack and a sound tube cannot be produced. The prior art provides no indication that efforts in solving this problem were fruitful, if, in fact, any such efforts were made. Perhaps because the applicability of such tubing to a vast range of structural purposes was not envisioned, efforts to solve the problem were either never undertaken or were abandoned, and it became an accepted fact in the industry that only non- or partially air hardenable steels can be successfully roller-formed and seam-welded.

Historically, air hardenable steel has been mainly used in applications that do not require welding. Air hardening steels were first commercially developed for use in cutlery for their high hardness. Common air hardenable steels include martensitic stainless steels. As defined herein, and as understood by those skilled in the art, martensitic stainless steels are essentially alloys of chromium and carbon that possess a body-centered-cubic (bcc) or body-centered-tetragonal (bct) crystal (martensitic) structure in the hardened condition. They are ferromagnetic and hardenable by heat treatment, and they are generally mildly corrosion resistant. As reflected in FIG. 1, martensitic stainless steels have also been defined, and are understood by those skilled in the art, as having a nickel equivalent of between about 4 and 12 and having a chromium equivalent of between about 8 and 15.5, where nickel equivalent is equal to (% Ni+30×% C)+(0.5×% Mn) and chromium equivalent is equal to (% Cr+% Mo+ (1.5×% Si)+(0.5×% Nb). Either or both of these definitions are acceptable for practicing the present invention. According to these standard definitions, standard martensitic stainless steels include types 403, 410, 414, 416, 416Se, 420, 420F, 422, 431, and 440A-C.

Air hardenable martensitic stainless steels include a relatively high carbon content compared to other stainless steels (0.15% C maximum in type 410 to 0.75% C maximum in type 440), and between 12 to 18% chromium. This composition results in steel with good corrosion resistance, due to the protective chromium oxide layer that forms on the surface, and the ability to harden via heat treatment to a high strength condition, but one that presents difficulties related to welding. Non-stainless air hardenable steels, which contain very high levels of carbon to allow the formation of a martensitic microstructure upon quenching, and are much more expensive than stainless types, also present difficulties related to welding, and have been primarily used for cutting tools.

Due to air hardenable steel's composition being specially formulated to render it heat treatable by a quench and temper process, it presents some unique problems during welding. The thermal cycle of heating and cooling, which occurs within the confined heat-affected-zone (HAZ) during welding, is equivalent to a quenching cycle. The resulting high carbon martensitic structure produced is extremely brittle in the untempered condition. Cracking of the weld zone can occur for several reasons, including:

Hydrogen induced cold-cracking, due to trapped hydrogen in the distorted BCC martensite crystal structure. Tensile stress applied to the weld increases the risk of cracking.

Thermal induced stresses, due to the heat input during welding, degree of joint restraint, and the volume change upon martensite transformation.

These problems occur when welding martensitic steels regardless of the prior condition, whether annealed, hardened, or hardened-and-tempered. They can occur with all types of welding, including GTAW, GMAW, laser-beam, friction, resistance and electron-beam. In all cases, the high-temperature HAZ will be in the "as-quenched" condition after welding. Any mechanical straining after welding (i.e. continuous tube mill forming/straightening) will cause the martensitic HAZ to crack. Conventional processes such as batch pre-heating and post weld heat treating (PWHT) do not lend themselves to cost-efficient, high-quality, high volume production.

In a minority of applications for air hardenable steel, welding is used to join separate pieces of the material. For these applications, textbooks related to the field teach a "preheating" method to control cracking. Using the preheating method, each entire workpiece is heated prior to welding. The latent heat in the workpiece reduces the cooling rate of the welded seam, and cracking is thus inhibited. However, there is no indication in the prior art that the preheating method was successfully applied to seam-welding roller-formed air hardenable steel into a tube—as can be seen by the fact that such a tube is not available. This may indicate limitations inherent in the method of preheating—for example, the method may only be reliable for relatively short welds at low welding speeds (i.e. manual welding) joining relatively small work pieces, where accumulated stresses due to weld shrinkage are relatively low and significant cooling of the work pieces does not occur before the weld bead is run from one end to the other. Or, it may indicate that others in the industry did not envision applying the method to the production of seam-welded air hardenable steel tubes, perhaps because they did not envision the tremendous utility of this type of tubing.

The use of air hardenable steels for structural applications was introduced in U.S. Pat. No. 5,485,948 and further described in U.S. Pat. No. 5,871,140. These patents provide brazed structures that take advantage of the fact that air hardenable stainless steel can be simultaneously brazed and hardened in one heat treating operation, including structures containing drawn tubing. Use of a lock seam tubing brazed and hardened in this manner was seen as having advantages in producing load bearing structures at low cost. However, the proposed lock seam increases the weight of the tubing, creates a stress riser and an uneven exterior and/or interior surface, and causes the tube to bow or distort when it is heat-treated.

Drawn air hardenable stainless steel tubing is found in the prior art and is available for purchase; however, it is prohibitively expensive for most structural applications.

Due to the performance liabilities of lock seam air hardenable stainless steel tubing and the expense of drawn air hardenable stainless steel tubing, it was determined that seam-welded air hardenable stainless steel tubing would give the highest overall performance for most structural applications. But, it was found that seam-welded air hardenable steel tubing, of either the preferred stainless type or of the non-stainless type, was not available. No one had solved the technical challenge of producing seam-welded tubing from air hardenable steel strip such that the tubing's HAZ is substantially free of cracks. Accordingly, the prior art did not provide a seam-welded, air hardenable steel tube.

Other than U.S. Pat. Nos. 5,485,948 and 5,871,140 and related international filings, the prior art did not describe the use of air hardenable stainless steel for structural purposes, although this is not surprising due to the difficulties involved in welding this material as described herein above. The most common structural materials in use today include reinforced concrete, mild steel, high strength steels, aluminum alloys, woods, and exotic materials such as carbon composites and titanium. Specific application requirements govern the selection of a structural material and the engineer chooses on the basis of factors such as cost, durability, corrosion-resistance, strength-to-weight ratio and stiffness-to-weight ratio, among other properties. Unfortunately, the choice often requires the engineer, and ultimately the end users of the structure, to sacrifice one or more desirable features, such as low cost, safety, lightness, or durability.

Structural materials are currently available in a broad range of strength-to-weight ratios, or specific strengths, but the costs of these materials generally increase disproportionately to their specific strengths. Carbon composites and titanium, for example, while being perhaps ten times stronger than mild steel for a given weight, are typically more than fifty times more expensive when used to bear a given load. Consequently, such high performance materials are typically used only in on small items, such as bicycles and tennis racquets, or in applications where the high cost is justified, such as in aircraft.

In cost-sensitive applications such as automobiles, conventional engineering materials force a trade-off between cost and fuel efficiency, safety, and performance. Consequently, the typical vehicle tends to have a frame that is both too heavy and too weak. A heavy frame requires a more powerful propulsion system, which leads to higher fuel consumption, higher emissions, and higher maintenance costs. The more powerful propulsion system is itself more expensive to build, uses more material, requires more energy to produce and leads to more emissions related to its manufacture. A lightweight, weak frame compromises the durability of the vehicle and the safety of its occupants.

Lack of a strong and lightweight yet low cost structural material is a main hindrance to the development of economically viable low emissions vehicles; vehicles that can compare in performance, safety, comfort, and price to those powered by the typical internal combustion power system. Without a light, economically competitive structural material to enable alternative power systems for moving vehicles, drastic emissions reduction will be extremely difficult to realize. Current lightweight alternatives to common steel for vehicle bodies are aluminum, plastics, high-strength steels, and exotic materials like magnesium and titanium. None of these materials can offer the required set of performance parameters for the frame elements of a vehicle, at a sufficiently low price. Some of these materials are superior to mild steel in one respect or another, but their cost offsets the advantage. In other respects, their performance is worse than mild steel.

With no lightweight structural material offering a quantum overall advancement in performance and price over mild steel, design of a lighter vehicle is an exercise in balancing trade-offs, offsetting disadvantages as well as possible. For example, vehicle lightness and safety are traditionally inversely related. In a 1997 article that surveys the currently available lightweight alternatives for vehicle bodies, two MIT professors wrote, "a lightweight car cannot rely on its structural components to protect passengers in the event of a crash and so will need to employ additional systems, like air bags, which add some weight." With the current choice of structural materials, it is likely that lightweight vehicle body research and development will be a lengthy and expensive process, with no certainty of reaching the performance and cost targets.

Compromises between objectives, brought about by structural material limitations, can be seen in many other areas and are being found increasingly unacceptable. For example, reinforced concrete bridges are weak and heavy, subject to failure in earthquakes and susceptible to aging. They also must be built on-site and take long amounts of time to build, which means new bridge construction undertaken to alleviate traffic congestion aggravates the problem during the lengthy construction period. Alternative bridge-building materials, such as carbon composites, are much stronger than reinforced concrete, and bridges of these materials can be erected faster than their concrete counterparts, but these materials are prohibitively expensive.

Solving traffic congestion problems is also dependent upon the development of a structural material that will deliver the required performance characteristics at a supportable cost. In many urban areas, the cost of expanding highways and freeways is prohibitive. Expanding vertically, building elevated inter-city high-speed trains and elevated "double-decker" freeways, is often proposed, but subsequent calculations of construction costs for the elevated railway or roadbed prohibit widespread adoption of these space-efficient solutions.

In building construction, the advantages offered by steel framing, of the type described in the prior art, are offset by its increased cost over traditional structural materials such as wood and masonry. A conventional steel-framed building is safer, more durable, and more energy-efficient than a comparably sized wood-framed building; but also more expensive.

Compromises between cost and performance can be seen in many other structural applications, such as aircraft, ships, bicycles, fluid and gas transfer piping, and heat exchangers. If seam-welded air hardenable steel tubing could be created, and specifically if it could be created through an inexpensive process using stainless steel, it could provide structural characteristics equivalent or superior to much more expensive materials.

SUMMARY OF THE INVENTION

The present invention provides a steel tube comprising air hardenable steel and a longitudinal welded seam, the tube characterized by a heat-affected zone (HAZ) substantially stable and free from cracks. As defined herein, an air hardenable steel is one that when welded and processed in a prior art tube mill will tend to crack. Air hardenable steels do not include steels specifically alloyed to partially inhibit hardening, limiting the formation of martensite in the HAZ, and thereby circumvent such cracking tendency. Therefore, as defined herein, OX Platinum is an example of steel excluded from the air hardenable steel category.

The preferred embodiment of the present invention is a seam-welded tube of air hardenable martensitic stainless steel. This embodiment provides revolutionary steel tubing that will enable new technologies and find widespread use in many diverse applications including moving vehicles, aircraft, bridges, buildings, fluid and gas transfer piping, elevated railways and roadbeds, heat exchangers, and ships. The principal advantages of this new tubing lie in its high specific strength low cost of production, corrosion resistance, and modular construction and pre-fabrication possibilities. A structural material with these advantages can solve many critical problems currently facing industry, government, and society at large, including pollution, traffic congestion, moving vehicle safety, aging transportation infrastructures, and structural damage, loss of human life and economic waste from seismic and weather related catastrophes.

Figure 1:
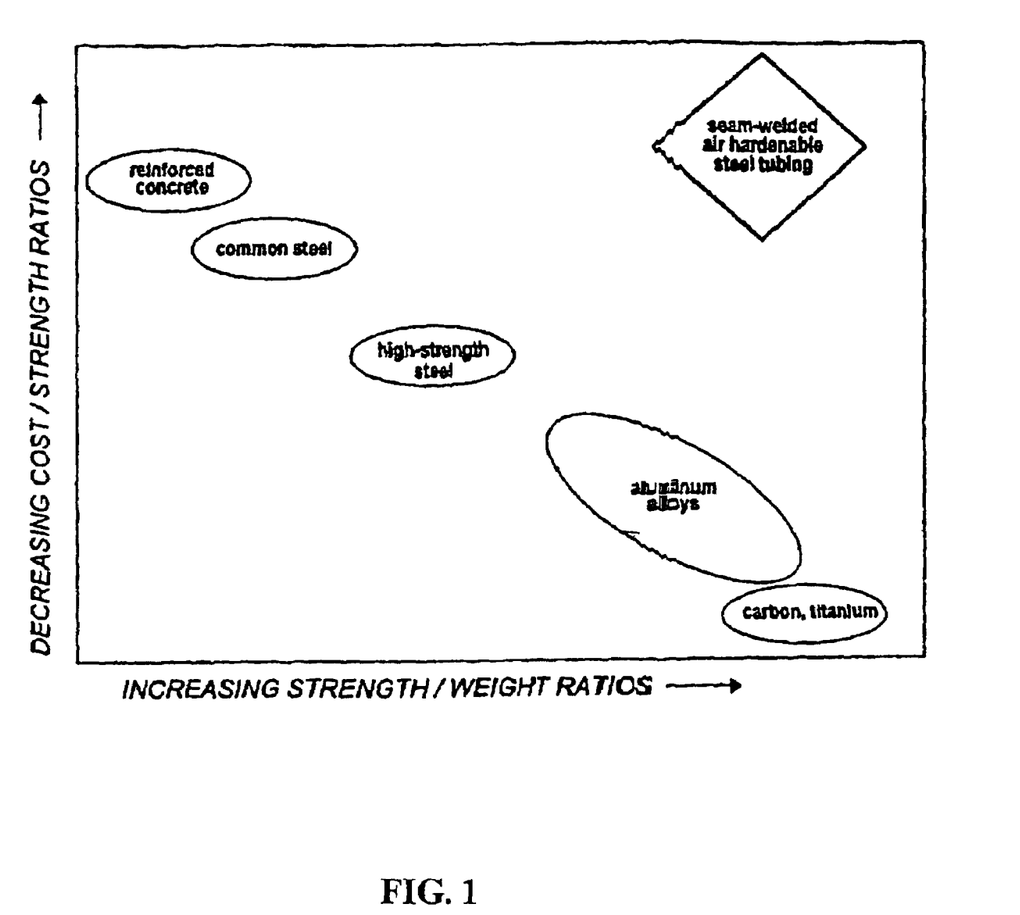
FIG. 1 is a chart illustrating relative strength/weight/cost advantages of the present invention.

For many applications, seam-welded air hardenable stainless steel tubing provides better performance for its cost than any other structural material available today. For structural applications, a critical consideration is the strength-to-weight ratio of a given material versus its cost per unit strength. FIG. 1 provides a comparison of the present invention (represented by the diamond) to the prior art in this regard. The chart shows the inverse relationship between cost and strength-to-weight ratio for traditional structural materials: the better the strength-to-weight ratio, the higher the cost. When plotted on the same chart, the present invention is distinctly off of the linear progression defined by the traditional materials. This graphically demonstrates the tremendous advancement in performance per unit cost afforded by the present invention.

Parts, such as a tube, can be designed to have a greater stiffness per unit area, or equivalently stiffness per unit mass, by thinning walls and increasing outside dimensions, thereby stressing the outer fibers to a higher level and increasing the area moment of inertia, and hence stiffness.

The seam-welded air hardenable stainless steel tubing of the present invention is cost-competitive because the alloying constituents (iron, carbon, and chromium) are inexpensive and plentiful, and because the methods of production of the present invention are suitable to automation, enabling a high quality product to be produced without the use of high-cost labor. This contrasts with the high labor costs incurred in the labor-intensive production of drawn air hardenable stainless steel tubing.

The present invention's inherent corrosion-resistant properties often allows an additional weight savings because painting, zinc coating, or engineering thicker walls in anticipation of corrosion is unnecessary. The tubing of the present invention can be made in a wide range of colors with no additional processing, including silver, black, and subdued hues of red, blue, green, and gold, simply by varying the temperature point in the heat treating process at which the material is transitioned from a controlled atmosphere to air. This finish can enhance the appearance of many articles.

The appearance of many articles can be further improved due to the high strength-to-weight ratio of the tubing, which allows structures to be designed with more slender, less imposing profiles. For example, overhanging freeway sign structures, which are typically blocky, galvanized, and unsightly, can be made much more aesthetically pleasing.

The present invention provides methods of manufacturing seam-welded air hardenable steel tubing that include controlling the cooling rate of the heat-affected-zone. The cooling rate is reduced to the point necessary to substantially reduce hardening of the heat affected-zone following seam welding. Embrittlement, and thus cold-cracking of the heat-affected-zone under mechanical straining and forming, is effectively eliminated by the present invention.

Figure 8:
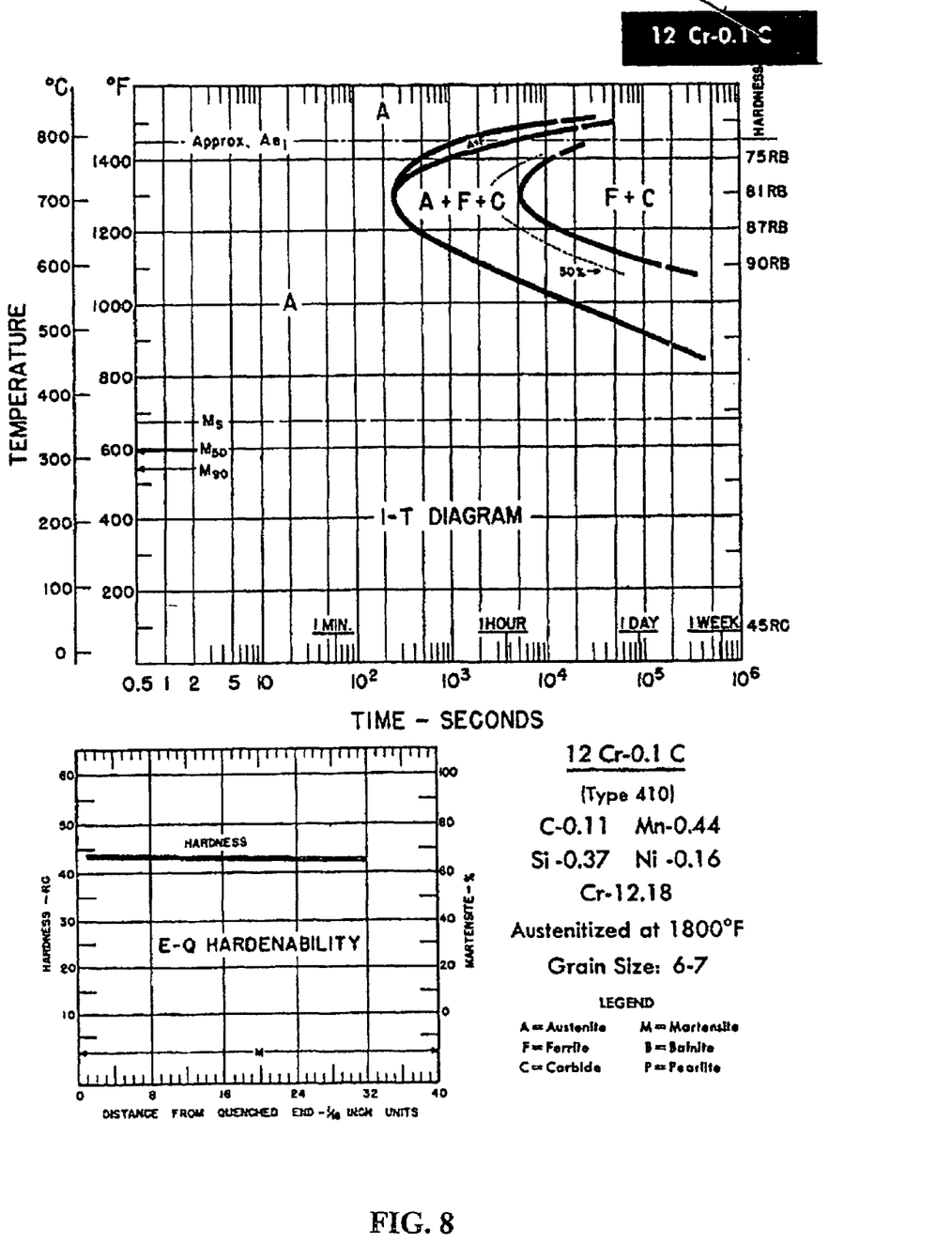
FIG. 8 is a Time-Temperature Transformation (TTT) Diagram for type 410 stainless steel.
Figure 9A:
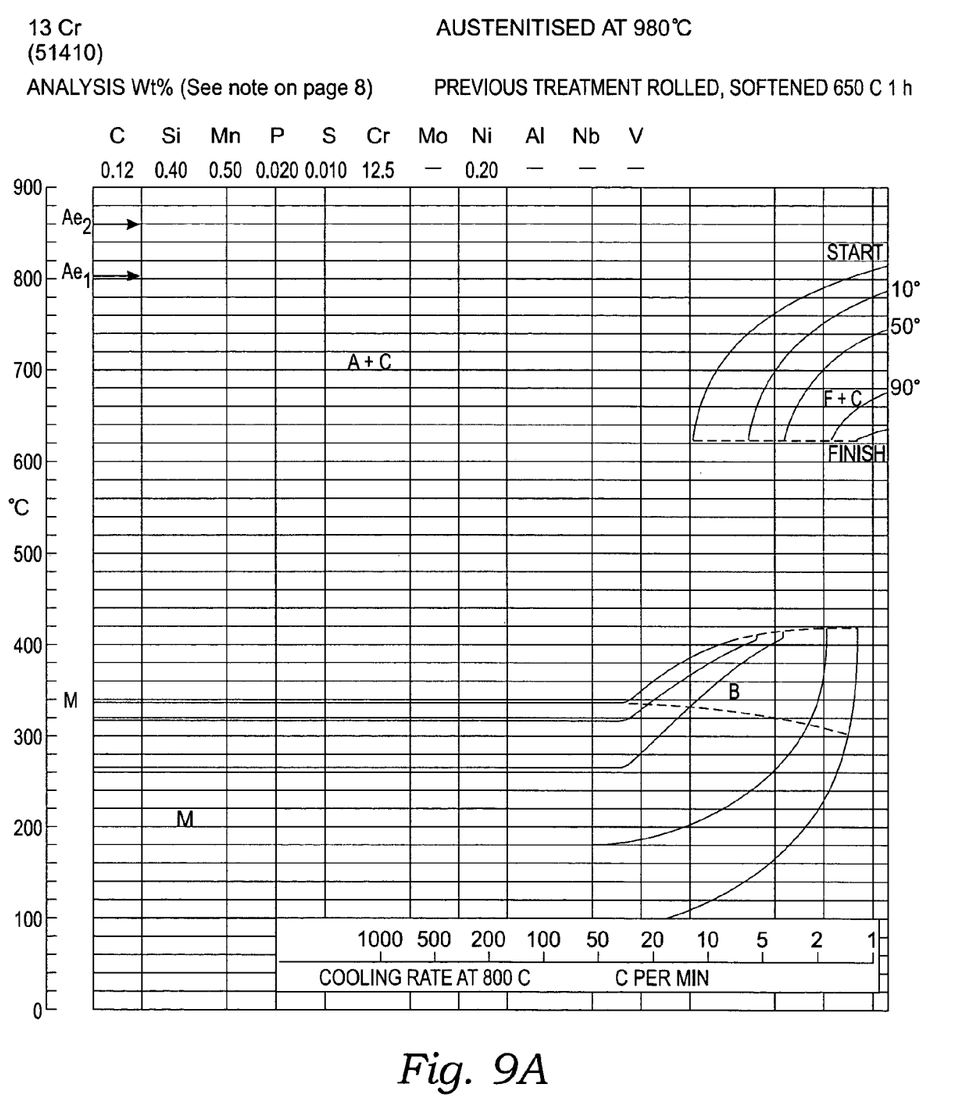
FIG. 9 is a Continuous Cooling Transformation (CCT) Diagram for 51410 stainless steel.
Figure 9B:
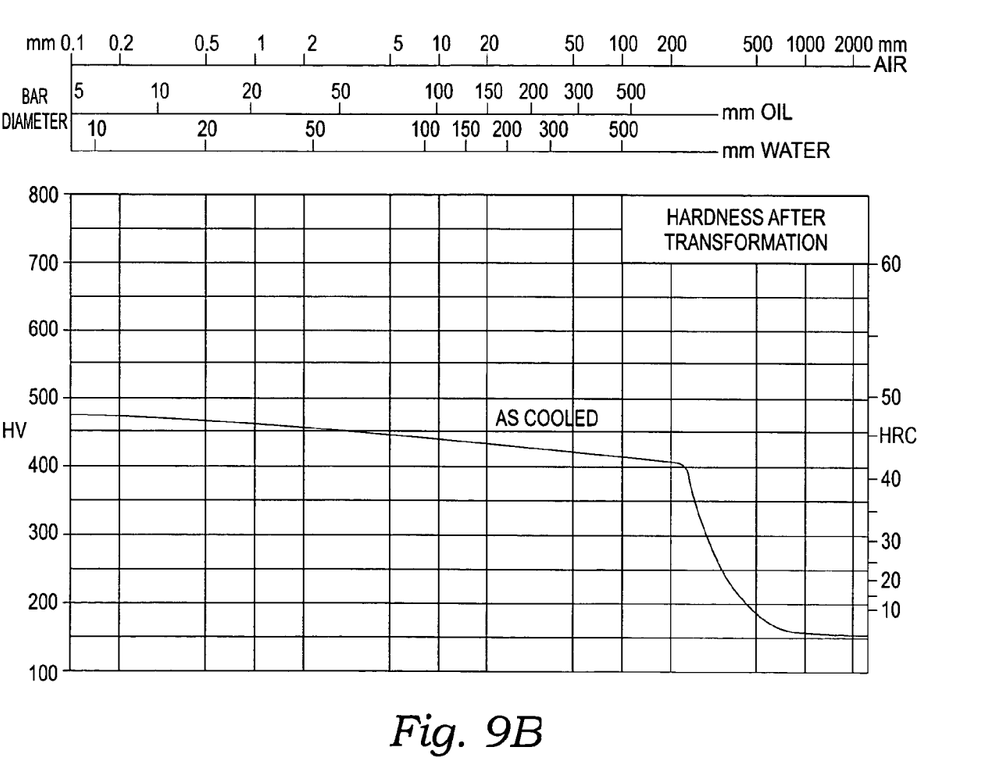

Standard heat-treating transformation curves, such as the Time-Temperature-Transformation (TTT) shown in FIG. 8 and Continuous-Cooling-Transformation (CCT) shown in FIG. 9 for air hardenable martensitic stainless steels illustrate that very long cooling times (i.e. slow cooling rates) are needed to prevent full martensite formation. This indicates that there are combined beneficial mechanisms at work, due to the present invention, which allow for seam-welding operations without cracking.

Although the tube-making methods disclosed herein could also be used to create sound tubes of non-stainless air hardenable steels, at the present time there is no non-stainless air hardenable material that can compete in cost or performance with air hardenable stainless steel, and therefore such tubes would not be desirable for use in structural applications. However, it is anticipated that various new formulations of air hardenable steel, including both new non-stainless and new stainless types, may be developed in response to the availability of the new methods of tube making disclosed herein. Since these new formulations may indeed be competitive with, or even superior to, currently available air hardenable stainless steel for some structural applications, it is an object of the present invention to use the methods herein described to seam-weld both stainless and non-stainless steels that are air hardenable.

Also, it is anticipated that new air hardenable steels containing constituents other than carbon, chrome and iron may be developed in order to improve various characteristics of the steels for various specific applications. Insofar as these new steels could not be seam-welded into a tube without the methods of production taught herein, seam-welded tubing of these steels would be considered to fall within the scope of this patent. In addition, various formulations and newly developed high-strength steel alloys, including Dual Phase, Duplex, High-Strength, and Ultra/Advanced High Strength Steels, would benefit from the high-speed seam welding process described herein. Virtually any alloy that has the tendency to form a martensitic microstructure in the HAZ, after high speed welding, can utilize this process to make the weld joint softer, more ductile, and less prone to cracking once cooled.

DETAILED DESCRIPTION OF THE INVENTION

The present invention includes methods of creating structures, tubes and tube-based structures from air hardenable steels. The present invention is believed to have particular application to martensitic stainless steels, and accordingly following description has particular application to such steels. The process of the present invention allows for mechanical straining and deformation of the weld-zone, both the fusion zone and HAZ, immediately after welding, eliminating the need for additional processing steps such as a process annealing or subcritical annealing post-weld-heat-treatment.

The preferred method of the present invention includes positively controlling the cooling rate of the weld zone immediately following welding on the mill, such that the weld zone never becomes fully hardened. In addition to altering the hardness of the weld zone (i.e. reducing the amount of martensite present in the weld area microstructure), several other HAZ cracking contributors that the process mitigates include:

allowing additional time for hydrogen diffusion and release while the steel is in the highly hydrogen soluble face-centered-cubic (FCC) austenitic crystal structure, before being trapped in the body-centered-tetragonal (BCT) martensitic structure, which has low hydrogen solubility. This retained hydrogen, when subject to applied tensile stresses, is the cause of hydrogen induced cold-cracking in martensitic alloys.

Reducing strains and stresses in the welded tube due to reduced thermal gradients along the length of the weld Promoting larger grain sizes in the fusion zone and HAZ with improved ductility Maintaining elevated temperature in material for ease in subsequent mechanical straining (sizing of tube) after welding This cooling rate control consists of applying heat to the seam downstream of the weld box to prevent rapid heat loss. Heat is applied to the weld area using any of a variety of localized heat sources including, but not limited to, propane or oxyacetylene torches, or induction coils. The term "localized" is used herein to describe heat sources that provide heat to an localized area of a component, but do not heat the entire component, such as provided by a furnace or oven. Heat is applied to the weld zone prior to the weld cooling below the lower critical temperature for martensitic stainless steel. The heat source applies a sufficiently high temperature maintained for a sufficiently long time period so as to reduce the hardness of said weld.

The preferred method of the present invention consists of the following steps: Air hardening steel strip is roller-formed into a tube (step 1) and seam-welded in a continuous process (step 2). Immediately following welding, and prior to sizing, the weld zone-cooling rate is positively controlled (step 3). The cooling rate is held to a profile that prevents the weld zone from fully hardening and becoming brittle, so that welding-induced stresses and sizing and straightening pass pressures do not crack the weld region.

Preferably the welding process is a gas tungsten arc welding process, commonly known as the tungsten inert gas process (TIG) or gas tungsten arc welding (GTAW). Other common stainless tube welding methods can be used, such as plasma arc welding or laser welding.

Preferably, the weld zone cooling rate is positively controlled through the use of a torch assembly or induction coil applied to the tubing downstream of the weld box. The weld area should be slow-cooled between the $A_3$ and $A_1$ temperatures a rate much slower than natural-air cooling. The $A_3$—upper critical temperature above which austenite is found, and $A_1$—lower critical temperature (eutectoid temperature) below which ferrite and carbide are stable are dependent on the alloy's chemical composition. The cooling rate is dependent upon weld/mill speed, tube size, wall thickness, alloy type and ambient conditions.

Under certain circumstances, cooling rate control and thus crack prevention may be effected in the tube-making process by preheating the steel strip prior to welding. Although references to preheating as a method of controlling cracking when welding air hardenable steel exist in the prior art, they focus solely on joining separate pieces of the material as opposed to producing tubes. The preheating method is a relatively imprecise and unreliable method of cooling rate control, and its prevalence in manuals teaching the art may have hindered the development of other, more positive methods of cooling rate control, such as the preferred method disclosed herein. In addition to being less precise and reliable, the preheating method is also less energy efficient than the positive cooling rate control method taught herein. Nevertheless, under certain conditions such as when warm ambient temperatures exist or when the strip being rolled is of a sufficient thickness, preheating the strip may be sufficient to produce a seam-welded air hardenable steel tube substantially free of cracks. Insofar as this method has not been proposed in the prior art as a method of producing seam-welded air hardenable steel tubing, and it was not envisioned that this specific application of this method could produce a novel structural material with great utility, it is an object of the present invention to create seam-welded air hardenable steel tubing using the preheating method as the only source of cooling rate control. Insulation of the tube downstream of the weld box to minimize heat loss to the surrounding air would maximize the chances of success in using the pre-heat system as the sole means of cooling rate control. It is also conceivable that under certain circumstances, best results would be achievable through the application of both preheating and post-heating methods of cooling rate control, in the same process. In either method, preheating or post-heating can be accomplished with standard metal heating processes, such as induction, torch, laser, conductive, radiative or convective methods.

It will be noted that in the present invention the tube mill was modified to suit the best material rather than, as in the prior art, modifying the material to suit prior art tube mills, to the detriment of tube performance. Accordingly, the present invention includes a new type of tube mill for the creation of seam-welded air hardenable steel tubing. In addition to the pre/post weld heating equipment, the mill can be modified to include means to continuously heat treat the tubing as it exits the forming stations. Tubing can be produced in as-welded, process annealed, fully annealed, fully hardened, and tempered variations.

To create a very light and strong frame structure, individual tube sections produced by one of the above methods are welded to form a frame of the desired configuration (step 4), and then the entire frame structure is heat-treated (step 5) to bring it to a uniformly hardened, high-strength condition. The frame weldment can include other components such as plates and flanges when required, which may or may not be made of air hardenable steel. After heat-treating, all air hardenable parts of the resulting structure are in the same high strength condition. Thus, the structure can be made free from weak spots, eliminating the need for thickened (butted) tube walls at the ends of the tubes, such as those traditionally used in many bicycle frames.

For other applications, where the tube will not be subsequently welded into a frame structure, the tube can be heat-treated to a hardened, high strength condition as it exits the tube mill, in a continuous process. Alternately, such individually-heat-treated tube sections may be assembled into a frame structure and then the entire structure can be heat-treated.

For applications where complex tube shapes are desired, the tube can be hydro formed, bent, flattened, flared, pierced or deformed and subsequently heat-treated if desired.

Facing Layer

The flat air hardenable steel strip from which the tube is made can be faced on one or both sides with a thin layer of a different type of metal, before it enters the roller-forming mill. Alternately, the facing layer(s) could be applied after the tube is formed. This technique can be employed, for example, to provide a higher corrosion resistance than the base tube would provide alone. A typical facing material for use in highly corrosive environments can be 316 stainless steel. Other criterion may be used for the selection of facing materials as well, such as electrical conductivity, surface roughness, surface friction coefficient, color and appearance.

The facing layers can be applied to the strip stock or base tube by lamination, plasma spraying, or other commonly known methods. In the favored embodiment, the facing layers would be applied to the strip stock by pinch rolling, such that the facing is welded to the substrate strip as the facing and strip pass between two rollers.

The facing layer on one side can be composed of a different type or thickness of metal than the facing layer on the other side. Tailoring the facing layers individually would be appropriate, for example, in applications where the corrosive conditions found on the inside of the tube differ from those found on the outside, as is often the case in heat exchangers.

As explained in the following sections, seam-welded air hardenable stainless steel tubing is ideal for many applications and offers great potential to remove many of the compromises between performance, environmental safety, and personal safety on the one side, and cost on the other, that are necessarily tolerated today.

Moving Vehicles

Figure 6:
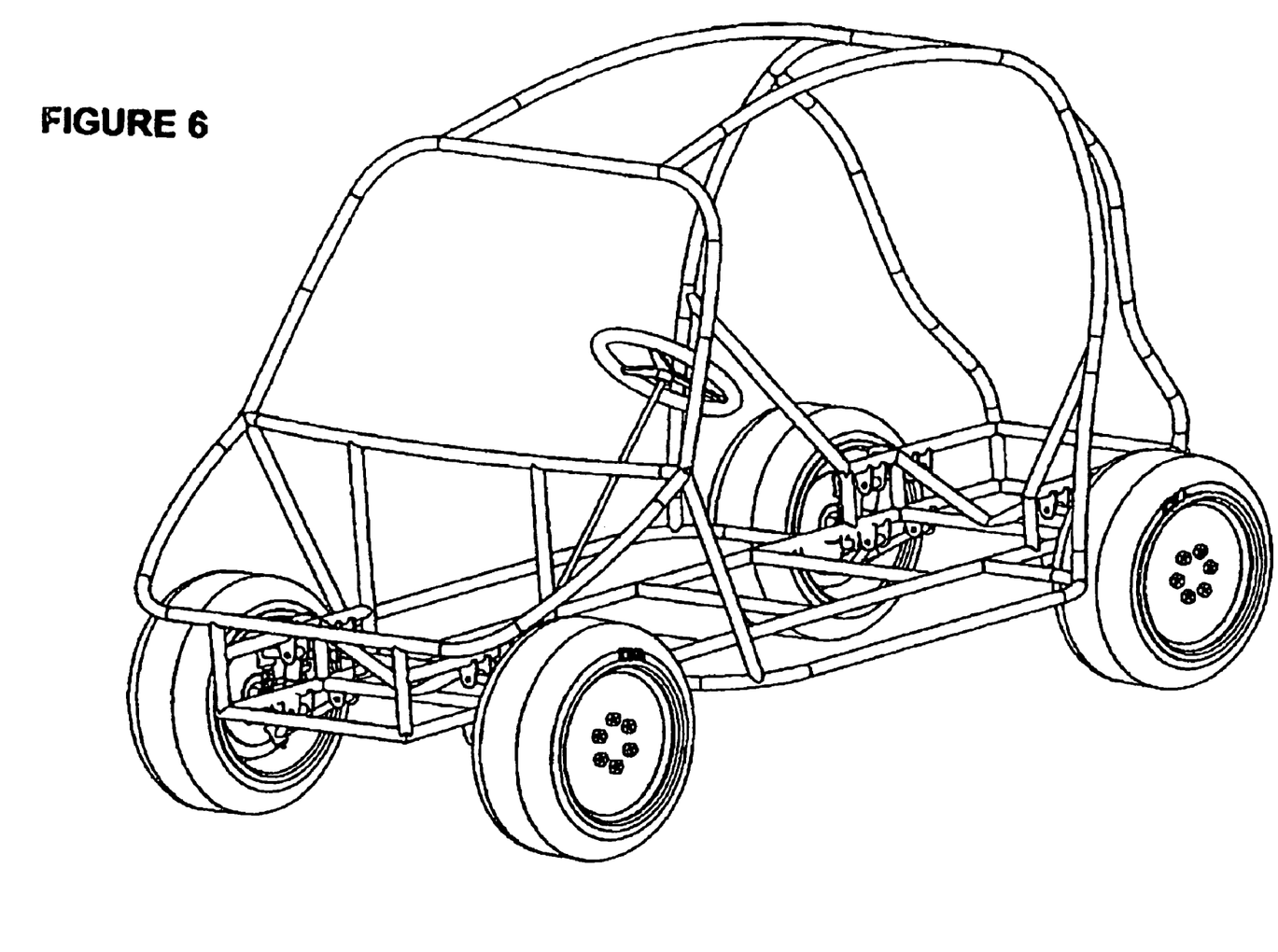
FIG. 6 is a side view of a mobile structure of the present invention.
Figure 7:
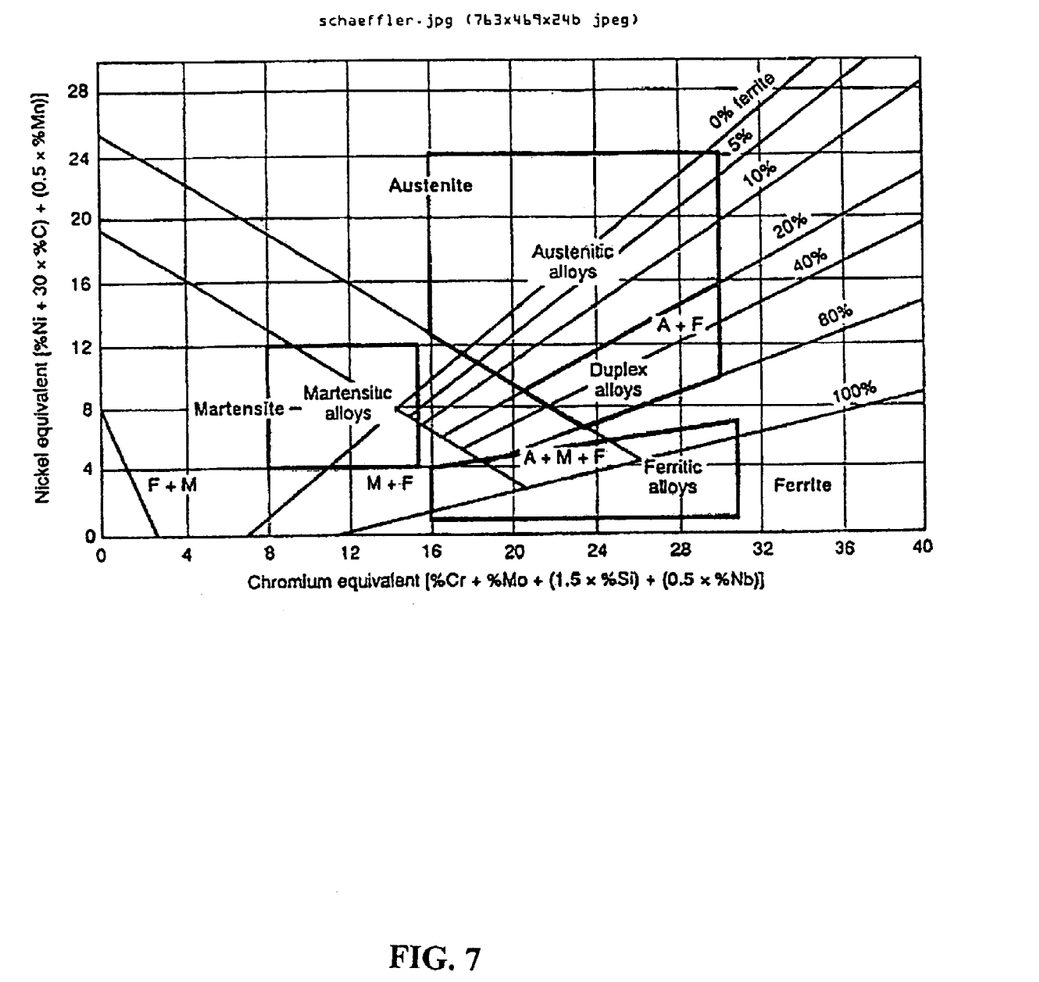
FIG. 7 is a chart illustrating a definition for martensitic stainless steel in terms of chromium equivalent and nickel equivalent.

The present invention provides moving vehicle frames constructed of seam-welded air hardenable stainless steel tubes. FIG. 6 provides a representation of a vehicle frame of the present invention. Vehicle frames of this material would be substantially lighter than conventional vehicle frames, allowing smaller propulsion systems and thereby increasing fuel efficiency and reducing vehicle cost. Due to its high strength-to-weight ratio, the present invention will enable alternative power motor vehicle technology, such as electric, hybrid-electric, or fuel cell powered vehicles. Vehicle frames can be made lighter much less expensively than through the use of existing composite materials or common steel. The availability of lighter vehicle frames would mean alternative power sources currently being developed could finally economically compete with the internal combustion engine. Many societal benefits would accrue from the popularization of cleaner and potentially more efficiently powered vehicles, including, most notably, emissions reduction. The tubing of the present invention could therefore contribute to the reduction of global warming, inasmuch as it is caused by vehicle emissions.

In addition to reducing vehicle weight, the present invention would also vastly improve motor vehicle safety. Like high-performance race cars but without the attached price tag, vehicles sporting a frame of this high strength-to-weight and stiffness-to-weight tubing would protect occupants from injury and death much better than a comparably sized conventional vehicle. The crash worthiness of rail cars, a major concern to the U.S. Federal Railroad Administration and its counterparts in other countries, could also be significantly improved through the use of this new structural material.

A breakthrough in vehicle durability can be realized through the use of seam-welded air hardenable stainless steel tubing as a structural medium. The material's inherent corrosion-resistant properties make painting, zinc coating, or engineering thicker walls in anticipation of corrosion unnecessary. Stainless steel tubing can outlast the vehicle's service life; when other vehicle components wear out and the vehicle is discarded, the tubing frame or components thereof can be re-used and recycled.

The present invention offers additional advantages for moving vehicles used for commercial purposes, such as trucks with flatbed trailers. Without compromising strength or durability, the present invention can substantially reduce the weight of these vehicles, thereby enabling their operators to carry greater payloads and increase profits. Furthermore, overall efficiency of cargo hauling is increased with attendant reduction in environmental damage.

The present invention would enable high-performance golf carts that are much lighter than comparably priced carts available on the market today. Vehicle lightness is important in this application to minimize damage to the golf course. Other types of utility vehicles, including Neighborhood Electric Vehicles, could also be produced at a lower cost and with higher performance through the use of seam-welded air hardenable stainless steel tubing.

Other moving vehicle applications that would benefit from seam-welded air hardenable stainless steel tubing include utility and boat trailers, buses, recreational vehicles such as snowmobiles and all terrain vehicles, and various kinds of push carts, including wheelbarrows and service carts such as those used in hotels and aircraft.

Bridges

Another excellent application for the tubing disclosed herein is bridges. Many of the world's bridges need to be replaced due to age or because they weren't built to support today's volume of traffic and have become "bottlenecks" exacerbating traffic congestion. In the United States alone, 30 of the total bridges, according to the National Bridge Research Organization, are targeted for replacement. Two problems governmental organizations face in undertaking a project of this magnitude are cost and traffic disruption; both of these problems are solved with the new structural material disclosed herein.

Using this tubing system, total costs for bridge construction can be a fraction of the costs incurred by using conventional structural materials, including reinforced concrete, high strength steels, and composites. One source of this cost savings is that the material lends itself to the pre-fabrication of entire bridges or subassemblies of bridges off-site, thereby minimizing traffic disruption and concomitant economic losses caused by lengthy on-site construction. Designers can take advantage of the tubing's ultra-high tensile, flexural, and fatigue strengths, and use smaller trusses to carry greater loads. This reduction in "dead load", or the weight of the bridge superstructure, will allow for even lighter bridge components to be used or much greater loads to be carried.

The ability to pre-fabricate a bridge off-site, made possible by the present invention, enables the construction of cost-effective, modular, temporary bridges in addition to permanent structures. It is envisioned that governments and relief organizations could stock an inventory of such modular bridges for fast deployment to relieve human suffering and prevent economic losses when floods occur. The military also requires temporary bridges that are mobile/portable (lightweight), can be produced at low cost, and are impact resistant. No structural material currently in existence can meet all of these requirements; the current solution being considered for military use is composite materials, which are lightweight but carry an extremely high price tag and could shatter from the shock of a nearby explosion.

Seam-welded air hardenable stainless steel tubing is also a superior bridge-building material in terms of earthquake safety, a major concern in the industry. Indeed, the vulnerability of concrete pillars can be seen in the efforts transportation departments are currently exerting to retrofit them with steel jackets. The support pillars of a seam-welded air hardenable steel tubing bridge would have a much lighter load to carry than its concrete counterpart.

Finally, unlike conventional bridges, bridges of seam-welded air hardenable stainless steel tubing, even those not specifically designed as temporary or mobile bridges, can be disassembled, moved, and quickly erected in a new location at a moderate cost.

Elevated Railways and Roadbeds

Figure 5:
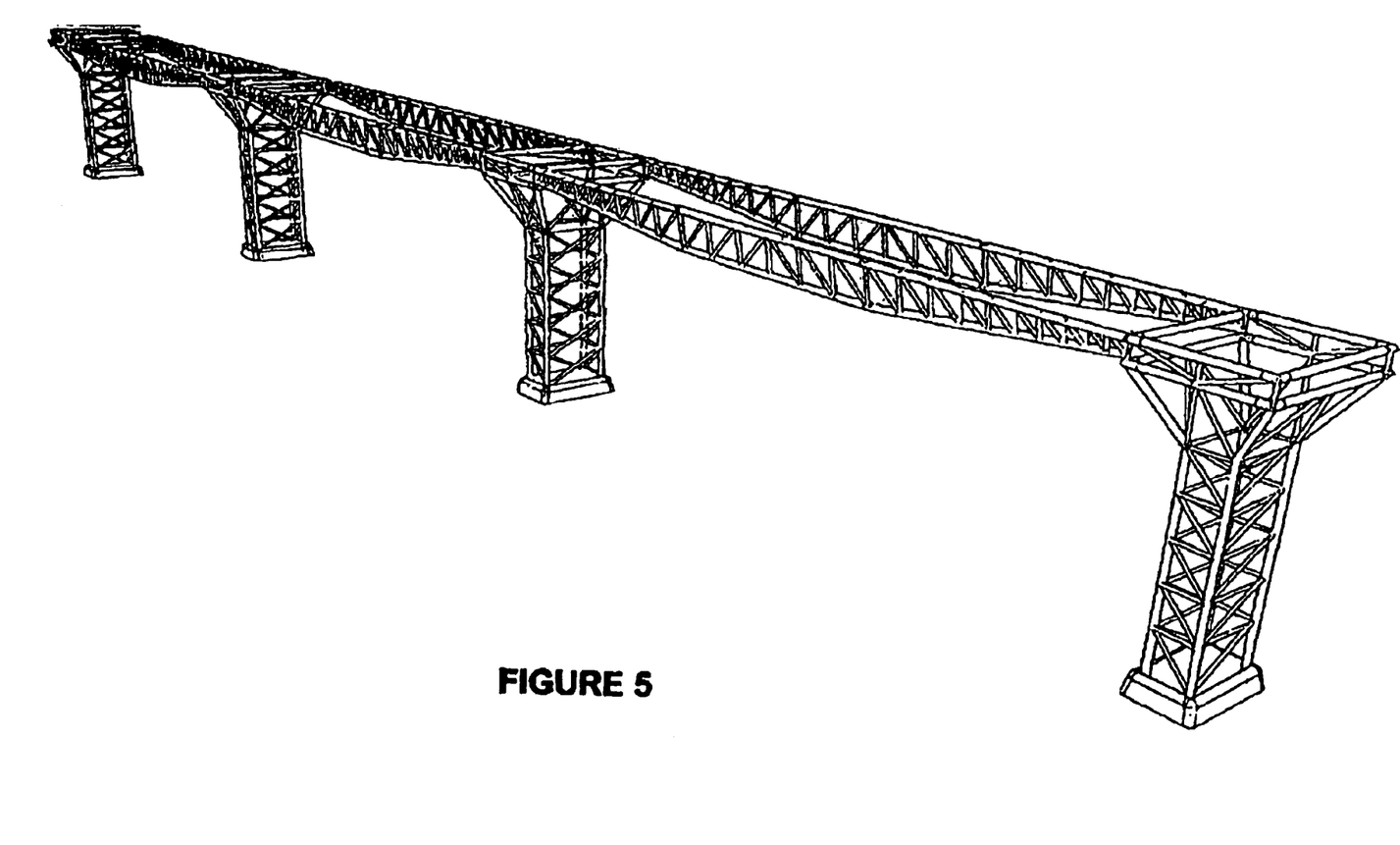
FIG. 5 is a side view of a static structure of the present invention.

The present invention also lends itself to the construction of extremely long "bridges", i.e. elevated railways and roadbeds. FIG. 5 provides a representation of the invention.

Population growth and ever-increasing traffic congestion has focused worldwide attention on the need for alternative transportation solutions such as inter-city high-speed trains, yet the costs of these proposals to date have been prohibitive in many instances. To clear urban traffic and retain the high speed that would enable it to compete with airliners and automobiles, the entire railway or parts of it would need to be elevated. Currently available structural materials for such an elevated track are expensive and require support pillars at frequent intervals. The present invention would enable a much less expensive elevated railway, with longer spans between support pillars, due to the greater strength of the material.

The present invention would also provide a cost-effective and high performance solution for elevated structures for other types of trains, including intra-city or airport monorails, light rail systems, and People Mover systems.

Cost and other factors related to purchasing a right-of-way corridor are prohibitive to the expansion of highways and freeways. Constructing a "double-deck", or viaduct, above an existing highway via conventional means is also prohibitively costly. Unable to expand highways and freeways horizontally or vertically, transportation departments are left in a quandary as to how to solve traffic congestion. The present invention would make elevated roadbeds a viable solution. Using seam-welded air hardenable stainless steel tubing in place of traditional structural materials, construction of an elevated roadbed would be considerably less expensive, due to both lower material costs and the ability to pre-fabricate the structure off-site, thereby minimizing traffic disruption. Using air rights above existing freeways and highways, transportation departments can increase road capacity without incurring the high costs of land acquisition.

The same elevated platform could be cost-effectively used for both motor vehicles and trains. Elevated platforms made of seam-welded air hardenable stainless steel tubing would be superior to their reinforced concrete counterparts in terms of earthquake safety, maintenance requirements, building speed and appearance.

Buildings

Many benefits can be realized from the use of seam-welded air hardenable stainless steel tubing as a structural medium in static structures, including private homes and public and industrial buildings.

A modular building construction system consisting of prefabricated truss-assemblies bolted or otherwise joined on site is envisioned. This system can be used in conjunction with conventional materials such as wood, drywall, various compositions of siding and paneling, etc., which would be most effectively employed as "fill-in" and covering materials and not relied upon for basic building strength.

The inherent qualities of seam-welded air hardenable stainless steel tubing enable a much higher overall cost efficiency in building construction. The basic load-bearing structure, consisting of columns and trusses of seam-welded air hardenable steel tubing, would be lightweight and inexpensive to transport, and therefore could be factory-produced off-site. Factory production via automated machinery is less expensive and results in a more standardized product than that producible by on-site skilled labor. Fast, easy, accurately aligned, on-site assembly is possible due to the inherent straightness and lack of distortion in the tube-based trusses, their lightness, and their suitability for use with standardized fittings. The tubing's high strength-to-weight ratio and stiffness-to-weight ratio enable longer spans with fewer vertical supports than can be made with conventional steel or wood.

In addition to increased cost effectiveness, the use of seam-welded air hardenable stainless steel tubing as a structural medium in buildings yields increased resistance to collapse in fire, a reduction of the fuel available for a fire, superior performance in earthquakes, severe storms and strong winds, increased durability and energy efficiency, and less susceptibility to flood and termite damage. Reduction of the risk of damage by fire or natural disaster will drive insurance costs down; an important consideration for private homes as well as for hospitals, schools, hotels, factories, shopping centers and malls, industrial buildings, aircraft hangars, and other public buildings. Also, as a new structural material that can compete in performance and price with wood, use of seam-welded air hardenable stainless steel tubing in building construction will reduce the rate by which we deplete our forests.

Seam-welded air hardenable stainless steel tubing offers new possibilities in architectural design. For example, it is desirable to design the interiors of many large public buildings, such as airport terminals, malls, train stations, and convention halls, as large, open spaces free from support columns. With the use of the present tubing material, long spans can be accommodated without resorting to very deep trusses. Furthermore, the total dead weight of a given truss is drastically reduced, with the attendant advantage of requiring less massive support columns, foundations, etc. In residential construction, roof trusses made by this system enable attic spaces free of the obstructing vertical members that are part of wood trusses.

The present invention also enables the construction of cost-effective movable and modular buildings, such as sheds, temporary buildings and mobile homes.

Fluid and Gas Transfer Piping

The present tubing system can yield substantial economic gains in the area of fluid and gas transfer, including the transfer of water, sewage and energy industry products such as crude oil, refined oil products and natural gas. Often, the strength-to-weight ratio and stiffness-to-weight ratio of the pipe are important, for example where a long horizontal run is elevated from the ground or where there is internal pressure. In these cases, the high strength-to-weight ratio and stiffness-to-weight ratio of seam-welded air hardenable stainless steel tubing enable longer horizontal spans between supports and thinner walls, resulting in advantages in terms of transport and placement of the pipe. Furthermore, it is envisioned that the present pipe can be produced in situ, in very long, continuous lengths, by the use of a mobile tube mill mounted on a truck trailer or ship, for example. Pipe thus produced in one continuous length results in far fewer joints for a given application, which reduces the cost and maximizes the strength-to-weight ratio of the pipe.

The petroleum industry makes heavy use of tubular materials for use in lifting, transporting, and refining oil and gas. The advantages of seam-welded air hardenable stainless steel tubing mentioned above apply in this area as well. In addition, the present tubing system can be used to produce high performance, low cost lifting rods for use in reciprocating artificial lift systems. As such, a "sucker rod" made of conventional material will be replaced by a sucker rod fabricated from a tube of the present invention, with the further advantage that the interior of the tube can be used for injecting well conditioning fluids or chemicals or alternately used as additional space for flowing well product to the surface. In this application as well, the tubing may be produced in one continuous length in situ, with the same advantages as mentioned above.

Aircraft

The lightness, low cost and high strength and stiffness of seam-welded air hardenable stainless steel tubing make it an ideal material for aircraft structures. Seam-welded air hardenable stainless steel tubing or truss structures made therefrom could be used for many parts of an aircraft structure, from the major framing, including wing spars, to interior accessories such as seat frames. As typical aircraft materials tend to be expensive, the present invention can reduce the cost of aircraft construction with no performance penalty.

Engine Components

Seam-welded air hardenable stainless steel tubing could be advantageously used for fabricating fan blades for turbofan engines and connecting rods for piston engines.

Ships

Framing members of seam-welded air hardenable stainless steel tubing can be used in the construction of ships, resulting in a dramatic weight savings and increased corrosion resistance in comparison with the use of traditional steel.

Heat Exchangers

As the present tube is very high strength, it is useful for heat exchangers because the tube walls can be made thinner, thus improving heat transfer per unit area of tubing wall. For increased corrosion resistance, one or both sides of the tubes in a heat exchanger can be faced with a thin layer of special material to give the desired characteristics.

Bicycles

Frame weight is very important in bicycles and exotic lightweight materials like carbon and titanium have found considerable use in this application despite their very high cost. The present invention allows for the production of bicycle frames, at a reasonable cost, of essentially the same weight, strength and stiffness as ones made of expensive, exotic materials. For example, drawn titanium has a greater strength-to-weight ratio on straight lengths of material. But it requires substantial wall thickness near weld zones as the metal loses strength in the heat-affected zone. The total mass of metal needed to create a bicycle of a certain strength would be similar in the case of titanium and the 410 tubing of the present invention. The cost difference is estimated to be 40-fold cheaper for a frame made from the present invention.

Hollow Springs

Air hardenable stainless steel inherently has very good spring characteristics. The tubing disclosed herein can thus be used as a spring medium in configurations such as helical tube and torque tube. As compared to typical springs, springs of seam-welded air hardenable stainless steel tubing would be lighter due to the elimination of the unstressed central core area of the spring medium, and would have a higher resistance to corrosion. Hollow springs of seam-welded air hardenable stainless steel tubing would be particularly suitable to the application of moving vehicles, where the reduction of overall vehicle weight is critical.

Personal Mobility Aids

The present invention makes possible the production of inexpensive, lightweight and high performance devices for the aid of physically-challenged individuals, including wheelchair frames, crutches and the like.

Missile Casings and Rocket Casings

The present tube can be advantageously employed for missile and rocket construction, as the missile and rocket walls can be made thinner and less costly than with traditional materials of the same strength. Reduced wall thickness lowers drag for a given internal space.

Space and Extra-Terrestrial Structures

The present tube can be advantageously employed in the construction of large-scale space or extra-terrestrial structures such as space stations, etc., due to its low cost and high performance.

Other applications for seam-welded air hardening stainless steel tubing include the following: cranes and gantries; fixtures for use in manufacturing, including aircraft manufacturing; supports and framing for concrete forms; catwalks and access ways; ladders; fence posts and railings; boat masts and boat railings; hydraulic and pneumatic cylinders; tools and implements; signposts, including overhanging freeway signposts; light poles, signal light poles, and flag poles; tent poles, awning frames, umbrellas, and canopy frames; oar and paddle shafts; racquet frames, ski poles and mountain-climbing equipment; elevator cars and shafts; highway guard rails; anti cave-in devices for construction trenches, mines, etc.; framing for dams; bleachers and temporary seating; platforms and stages; scaffolding frames and frames for temporary enclosures, such as those used for sand-blasting buildings and ships; car-top racks; optical and radio telescopes; saw horses and portable work benches; tripods, including camera tripods; vertical towers, including telephone poles, radio transmission towers, power transmission towers, and ski lift and tramway towers; electrical and fiber optic cabling conduit; chimneys and smokestacks; furniture; and storage and pressure tanks.

Each of these applications would benefit from this inexpensive, light, strong, and corrosion-resistant tubing system. Indeed, the tubing disclosed herein is an excellent option for any application requiring a light, strong, and/or corrosion-resistant structure.

EXAMPLE 1

Tubing

A 100-foot run of tubing of 1.125" OD diameter with 0.020" wall thickness was manufactured. It was manufactured on a mill of the present invention from 3.555" width type 410 stainless steel strip from Ulbrich Steel of Fresno, Calif., in a manner provided herein above.

Figure 4:
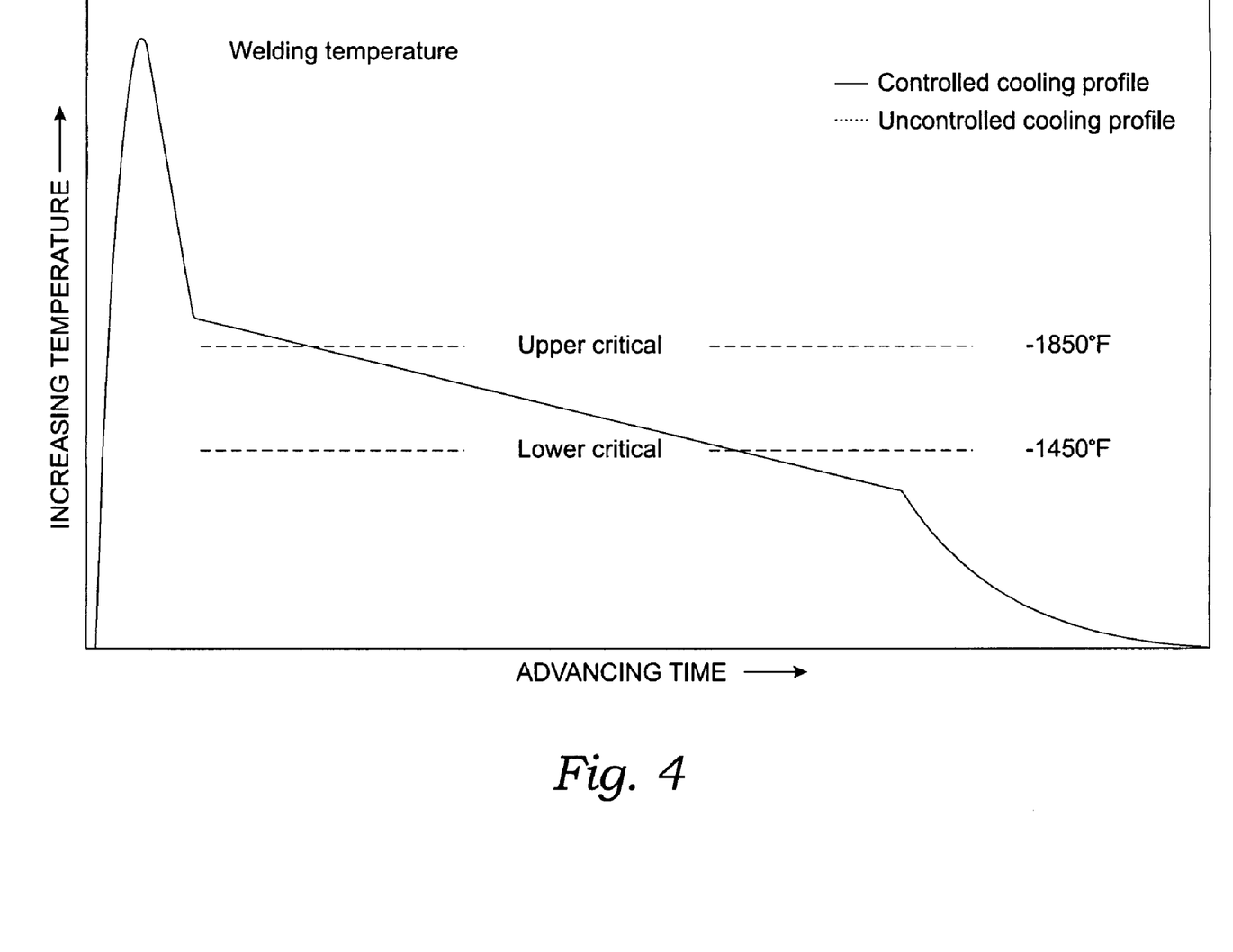
FIG. 4 is a cooling profile chart.

The welding machine used on the mill was a Lincoln® Squarewave TIG 255, manufactured by the Lincoln Electric Company, of Cleveland, Ohio, and was set at approximately 35 amps in an argon atmosphere. No filler was added. The feed speed of the stainless steel strip into the weld box was two inches per second. The welded tubing was subjected to positively controlled cooling through use of an acetylene torch positioned downstream of the weld box. The flame thereof was adjusted so the heat-affected zone cooled slowly from the upper to the lower critical temperature, the difference between the natural and the controlled cooling rate being represented by FIG. 4. It was estimated that the controlled cooling rate was approximately six times the natural cooling rate. The upper and lower critical temperatures ($A_3$ and $A_1$) for type 410 stainless are 1850° and 1450° respectively.

EXAMPLE 2

Bicycle Frame

Tubing sections from the above run were cut and assembled into a bicycle frame with other drawn tubing. The drawn tubing included in the assembled frame included type 410 stainless steel drawn tubing sections of 0.5" and 0.625" OD with 0.020" wall thickness for the rear triangle. The seam-welded and drawn tubing sections were assembled by hand via butt welding using a Lincoln® Squarewave TIG 255, manufactured by the Lincoln Electric Company, of Cleveland, Ohio using standard type 410 stainless filler rod supplied by San Diego Welding Supply of San Diego, Calif. and modulating the amperage of the welder between approximately 8 to 10 amps. The assembled frame was then heat treated in a batch-type vacuum furnace to a range of 1800 to 1850° F. Certified Metalcraft of El Cajon, Calif. provided the heat-treating furnace. The heat-treating was performed to SAE/AMS 2759/5D and MIL-H-6875 specifications.

The bicycle using this frame was subjected to rigorous field-testing in remote and difficult terrain and was found to be light, responsive and suitably stiff. The frame did not fail. No performance differences between the drawn and seam-welded portions of the frame were noticed.

EXAMPLE 3

Tension Fatigue at Room Temperature

Fatigue testing at room temperature was performed to generate data concerning the strength of a hardened, seam-welded stainless steel tube of the present invention that was hardened in a manner similar to that of the bicycle frame.

It was believed the testing would show none of the cracks typically found in the heat-affected zone of finished tubing of the prior art. The tube tested, after it was hardened, was a piece of the tube run described in Example 1. The test piece was tested in accordance with MIL-STD-1312-11A. The work piece was subjected to 130,000 cycles with a low load of 500 pounds (7,000 psi) and a high load of 5,000 pounds (70,000 psi) of axial tension. This piece was not tested to failure.

This testing proved that at least one method of the present invention does not produce the tubes of the prior art that had visible and invisible cracks, which would initiate failure in the weld zone.

EXAMPLE 4

Axial Tensile Test

The sample was tested in accordance with ASTM F 606-00 to determine the tensile strength of a tube of the present invention. The work piece resulted in 14,453 lbs applied (206,000 psi). Book value of as-hardened 410 is 200,000 to 210,000 psi. The failure did not initiate in the weld zone or HAZ. These data prove that the weld zone does not provide any weakness in the overall structure such that this material is equivalent to a drawn tube of similar diameter, wall thickness and material.

EXAMPLE 5

Tube Mill

Figure 2:
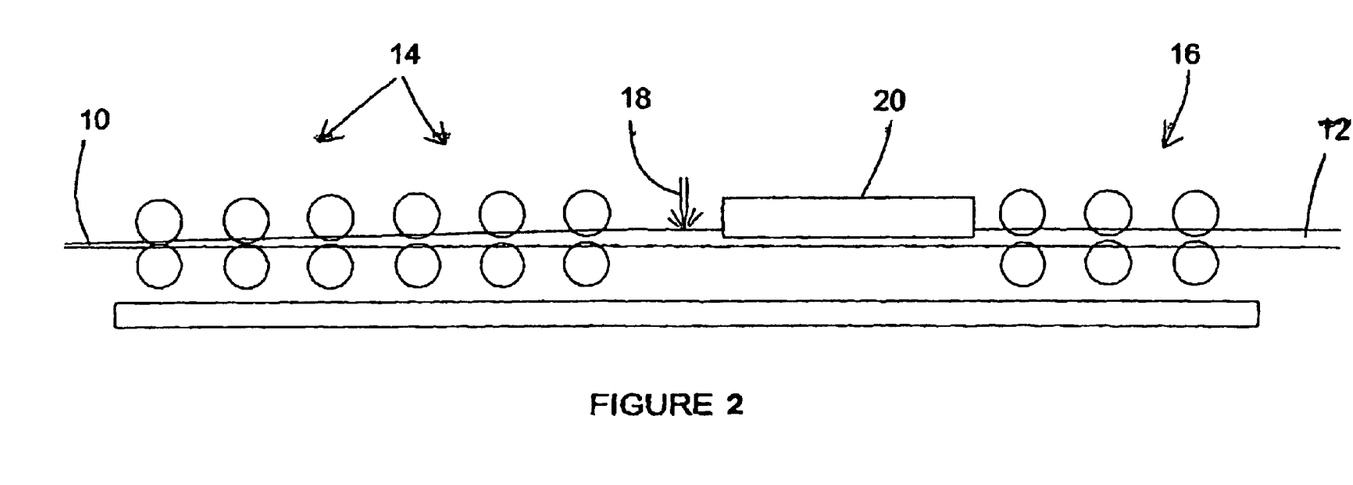
FIG. 2 is a side view of a tube mill of the present invention.
Figure 3:
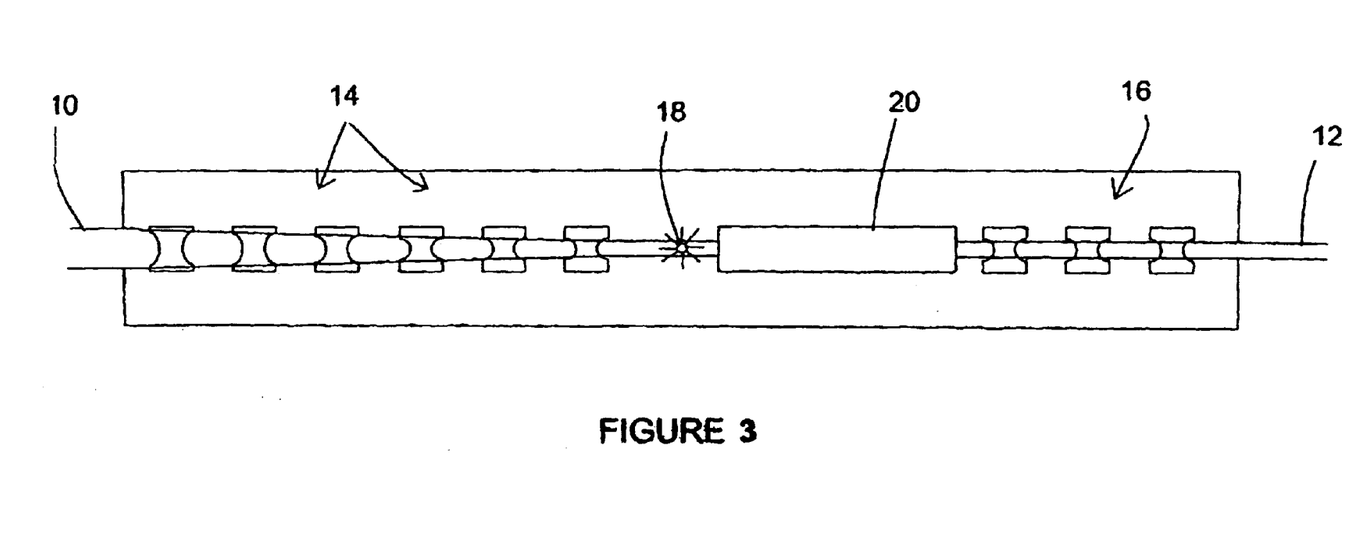
FIG. 3 is a top view of a tube mill of the present invention.

FIGS. 2 and 3 provide side and top views of a tube mill of the present invention. Strip 10 is fed through sizing and shaping rollers 16 that is then fed into a welding box 20. Downstream of the welding box 20 is a torch assembly 18 used to control the cooling rate of the welded piece. The welded piece is then sized in sizing rollers 14 to produce the seam-welded air hard enable tubing 12 of the present invention.

While several particular forms of the invention have been illustrated and described, it will be apparent that various modifications can be made without departing from the spirit and scope of the invention. Accordingly, it is not intended that the invention be limited except by the following claims.

I claim:

1. A method of forming a steel structure comprising the steps of:
   providing a first surface of an air hardenable martensitic stainless steel;
   providing a second surface of an air hardenable martensitic stainless steel;
   said martensitic stainless steels having a carbon content equal or greater than 0.08% by weight;
   positioning said first surface adjacent to said second surface;
   welding said first surface to said second surface by applying a first heat source to said first surface and said second surface at a sufficiently high temperature to said first surface and said second surface above their melting points to form a weld;
   applying a second heat source said weld immediately after said step of welding so as to be prior to said weld cooling below the lower critical temperature for said martensitic stainless steels, said second heat source being at a temperature lower than said first heat source but at a sufficiently high temperature and maintained for sufficient long time period so as to reduce the hardness of said weld.

2. The method of forming a steel structure of claim 1 further comprising roller forming the steel structure into a desired shape, said step of roller forming occurring after the steps of welding said first and second surfaces and applying a second heat source to said weld.

3. The method of forming a steel structure of claim 1 wherein the steel structure is a tube and said first surface defines a first edge of a roll formed strip of martensitic stainless steel and second surface defines a second edge of roll formed strip of martensitic stainless steel.

4. The method of forming a steel structure of claim 1 wherein each of said martensitic stainless steels are type 410.

5. The method of forming a steel structure of claim 1 wherein each of said martensitic stainless steels are type 420.

6. The method of forming a steel structure of claim 1 wherein the martensitic stainless steels have has a carbon content substantially equal or greater than 0.08% by weight and a chromium content substantially equal or greater than 11.5% by weight.

7. The method of forming a steel structure of claim 1 wherein the martensitic stainless steels have has a carbon content substantially between 0.08% by weight and 0.75% by weight and a chromium content substantially between 11.5% by weight and 18% by weight.

* * * * *